(12) United States Patent
Fujikura et al.

(10) Patent No.: US 9,512,500 B2
(45) Date of Patent: Dec. 6, 2016

(54) NON-ORIENTED ELECTRICAL STEEL SHEET, METHOD OF MANUFACTURING THE SAME, LAMINATE FOR MOTOR IRON CORE, AND METHOD OF MANUFACTURING THE SAME

(75) Inventors: Masahiro Fujikura, Tokyo (JP); Yoshiyuki Ushigami, Tokyo (JP); Tesshu Murakawa, Tokyo (JP); Shinichi Kanao, Tokyo (JP); Makoto Atake, Tokyo (JP); Takeru Ichie, Tokyo (JP); Kojiro Hori, Tokyo (JP); Shinichi Matsui, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 385 days.

(21) Appl. No.: 14/129,334

(22) PCT Filed: Aug. 16, 2012

(86) PCT No.: PCT/JP2012/070861
§ 371 (c)(1),
(2), (4) Date: Dec. 26, 2013

(87) PCT Pub. No.: WO2013/024894
PCT Pub. Date: Feb. 21, 2013

(65) Prior Publication Data
US 2014/0113159 A1  Apr. 24, 2014

(30) Foreign Application Priority Data

Aug. 18, 2011 (JP) .................................. 2011-179081
Aug. 18, 2011 (JP) .................................. 2011-179111

(51) Int. Cl.
| | |
|---|---|
| C22C 38/02 | (2006.01) |
| C22C 38/04 | (2006.01) |
| C22C 38/06 | (2006.01) |
| C22C 38/14 | (2006.01) |
| C21D 8/12 | (2006.01) |
| H01F 1/16 | (2006.01) |
| B32B 15/00 | (2006.01) |
| C21D 8/00 | (2006.01) |
| C22C 38/12 | (2006.01) |
| B32B 15/01 | (2006.01) |
| C21D 9/46 | (2006.01) |
| H01F 3/08 | (2006.01) |

(52) U.S. Cl.
CPC ............ *C21D 8/005* (2013.01); *B32B 15/011* (2013.01); *C21D 8/12* (2013.01); *C21D 8/1244* (2013.01); *C21D 8/1272* (2013.01); *C21D 9/46* (2013.01); *C22C 38/02* (2013.01); *C22C 38/04* (2013.01); *C22C 38/06* (2013.01); *C22C 38/12* (2013.01); *C22C 38/14* (2013.01); *H01F 1/16* (2013.01); *C21D 2201/05* (2013.01); *C21D 2211/004* (2013.01); *C21D 2211/005* (2013.01); *H01F 3/08* (2013.01); *Y10T 428/12965* (2015.01)

(58) Field of Classification Search
None
See application file for complete search history.

(56) References Cited

U.S. PATENT DOCUMENTS

| | | | |
|---|---|---|---|
| 7,513,959 | B2 | 4/2009 | Takashima et al. |
| 2006/0052572 | A1 | 3/2006 | Hofacker |
| 2009/0301609 | A1 | 12/2009 | Arita et al. |
| 2011/0056592 | A1 | 3/2011 | Arita et al. |

FOREIGN PATENT DOCUMENTS

| | | | |
|---|---|---|---|
| EP | 2045347 | 4/2009 | |
| EP | 2278034 | 1/2011 | |
| EP | 2746418 | 6/2014 | |
| JP | 57052350 A * | 3/1982 | ............ H02K 15/02 |
| JP | 02-008346 | 1/1990 | |
| JP | 06-330255 | 11/1994 | |
| JP | 10-018005 | 1/1998 | |
| JP | 10-088298 | 4/1998 | |
| JP | 11-229094 | 8/1999 | |
| JP | 2003-105508 | 4/2003 | |
| JP | 2004-084053 | 3/2004 | |
| JP | 2004-183066 | 7/2004 | |

(Continued)

OTHER PUBLICATIONS

International Search Report dated Nov. 13, 2012 issued in corresponding PCT Application No. PCT/JP2012/070861 [With English Translation].
Extended European Search Report dated Aug. 5, 2015 issued in corresponding European Application No. 12823285.7.
International Preliminary Report on Patentability dated Feb. 20, 2014 issued in corresponding PCT Application No. PCT/JP2012/070861.

*Primary Examiner* — Deborah Yee
(74) *Attorney, Agent, or Firm* — Birch, Stewart, Kolasch & Birch, LLP

(57) ABSTRACT

When contents of Ti, V, Zr, Nb, and C (mass %) are represented as [Ti], [V], [Zr], [Nb], and [C] respectively, a value of a parameter Q represented by "Q=([Ti]/48+[V]/51+[Zr]/91+[Nb]/93)/([C]/12)" is not less than 0.9 nor more than 1.1. A matrix of a metal structure is a ferrite phase, and the metal structure does not include a non-recrystallized structure. An average grain size of ferrite grains constituting the ferrite phase is not less than 10 μm nor more than 200 μm. A precipitate containing at least one selected from the group consisting of Ti, V, Zr, and Nb exists with a density of 10 μm$^{-3}$ or more in the ferrite grain. An average grain size of the precipitate is not less than 0.002 μm nor more than 0.2 μm.

16 Claims, No Drawings

(56) References Cited

FOREIGN PATENT DOCUMENTS

| | | |
|---|---|---|
| JP | 2005-264315 | 9/2005 |
| JP | 2006-009048 | 1/2006 |
| JP | 2006-70269 | 3/2006 |
| JP | 2007-039721 | 2/2007 |
| JP | 2007-039754 | 2/2007 |
| JP | 2007039721 | 2/2007 |
| JP | 2008-50685 | 3/2008 |
| JP | 2008308704 | 12/2008 |
| WO | 2009/128428 | 10/2009 |

* cited by examiner

NON-ORIENTED ELECTRICAL STEEL SHEET, METHOD OF MANUFACTURING THE SAME, LAMINATE FOR MOTOR IRON CORE, AND METHOD OF MANUFACTURING THE SAME

This application is a national stage application of International Application No. PCT/JP2012/070861, filed Aug. 16, 2012, which claims priority to Japanese Application Nos. 2011-179111, filed Aug. 18, 2011; and 2011-179081, filed Aug. 18, 2011, each of which is incorporated by reference in its entirety.

TECHNICAL FIELD

The present invention relates to a non-oriented electrical steel sheet suitable for an iron core material of an electric apparatus, a method of manufacturing the same, and so on.

BACKGROUND ART

In recent years, a motor rotating at a high speed and having a relatively large capacity is increasingly used as a driving motor of an electric vehicle, a hybrid vehicle, and the like. For this reason, an iron core material to be used for a driving motor is required to have achievement of low core loss in a range of several hundred Hz to several kHz higher than a commercial frequency. Further, an iron core to be used for a rotor is also required to have a certain mechanical strength in order to withstand a centrifugal force and a stress variation. An iron core material to be used for other than a driving motor of a vehicle sometimes needs to have such a requirement.

Conventionally, some techniques have been proposed whose purposes are core loss reduction, strength improvement and/or the like (Patent Literatures 1 to 12).

However, with these techniques, it is difficult to attain achievement of the core loss reduction and the strength improvement. Further, some of the techniques have difficulty in actually manufacturing a non-oriented electrical steel sheet.

CITATION LIST

Patent Literature

Patent Literature 1: Japanese Laid-open Patent Publication No. 02-008346
Patent Literature 2: Japanese Laid-open Patent Publication No. 06-330255
Patent Literature 3: Japanese Laid-open Patent Publication No. 2006-009048
Patent Literature 4: Japanese Laid-open Patent Publication No. 2006-070269
Patent Literature 5: Japanese Laid-open Patent Publication No. 10-018005
Patent Literature 6: Japanese Laid-open Patent Publication No. 2004-084053
Patent Literature 7: Japanese Laid-open Patent Publication No. 2004-183066
Patent Literature 8: Japanese Laid-open Patent Publication No. 2007-039754
Patent Literature 9: Japanese Laid-open Patent Publication No. 10-88298
Patent Literature 10: International Publication Pamphlet No. WO2009/128428
Patent Literature 11: Japanese Laid-open Patent Publication No. 2003-105508
Patent Literature 12: Japanese Laid-open Patent Publication No. 11-229094

SUMMARY OF INVENTION

Technical Problem

The present invention has an object to provide a non-oriented electrical steel sheet capable of attaining achievement of a core loss reduction and a strength improvement, a method of manufacturing the same, and so on.

Solution to Problem

The present invention has been made in order to solve the above-described problems, and the gist thereof is as follows.

(1) A non-oriented electrical steel sheet containing:
in mass %,
C: greater than 0.01% and 0.05% or less;
Si: not less than 2.0% nor more than 4.0%;
Mn: not less than 0.05% nor more than 0.5%;
Al: not less than 0.01% nor more than 3.0%; and
at least one selected from the group consisting of Ti, V, Zr, and Nb,
a balance being composed of Fe and inevitable impurities, wherein
when contents of Ti, V, Zr, Nb, and C (mass %) are represented as [Ti], [V], [Zr], [Nb], and [C] respectively, a value of a parameter Q represented by "Q=([Ti]/48+[V]/51+[Zr]/91+[Nb]/93)/([C]/12)" is not less than 0.9 nor more than 1.1,
a matrix of a metal structure is a ferrite phase,
the metal structure does not include a non-recrystallized structure,
an average grain size of ferrite grains constituting the ferrite phase is not less than 10 μm nor more than 200 μm,
a precipitate containing at least one selected from the group consisting of Ti, V, Zr, and Nb exists with a density of 10 $\mu m^{-3}$ or more in the ferrite grain, and
an average grain size of the precipitate is not less than 0.002 μm nor more than 0.2 μm.

(2) The non-oriented electrical steel sheet according to (1), further containing:
in mass %, at least one selected from the group consisting of
N: not less than 0.001% nor more than 0.004%;
Cu: not less than 0.5% nor more than 1.5%; and
Sn: not less than 0.05% nor more than 0.5%.

(3) The non-oriented electrical steel sheet according to (1) or (2), wherein the precipitate is at least one selected from the group consisting of carbide, nitride, and carbonitride.

(4) A method of manufacturing a non-oriented electrical steel sheet including:
performing hot rolling of a slab heated to a temperature of not lower than 1100° C. nor higher than 1330° C. to obtain a hot-rolled steel sheet;
performing cold rolling of the hot-rolled steel sheet to obtain a cold-rolled steel sheet; and
performing finish annealing of the cold-rolled steel sheet, wherein
the slab contains:
in mass %,
C: greater than 0.01% and 0.05% or less;
Si: not less than 2.0% nor more than 4.0%;
Mn: not less than 0.05% nor more than 0.5%;

Al: not less than 0.01% nor more than 3.0%; and at least one selected from the group consisting of Ti, V, Zr, and Nb, a balance being composed of Fe and inevitable impurities, and when contents of Ti, V, Zr, Nb, and C (mass %) are represented as [Ti], [V], [Zr], [Nb], and [C] respectively, a value of a parameter Q represented by "Q=([Ti]/48+[V]/51+[Zr]/91+[Nb]/93)/([C]/12)" is not less than 0.9 nor more than 1.1.

(5) The method of manufacturing the non-oriented electrical steel sheet according to (4), wherein the slab further contains:

in mass %, at least one selected from the group consisting of

N: not less than 0.001% nor more than 0.004%;

Cu: not less than 0.5% nor more than 1.5%; and

Sn: not less than 0.05% nor more than 0.5%.

(6) The method of manufacturing the non-oriented electrical steel sheet according to (4) or (5), further including, before the performing cold rolling, performing hot-rolled sheet annealing of the hot-rolled steel sheet.

(7) A laminate for a motor iron core including:

non-oriented electrical steel sheets laminated to one another, wherein each of the non-oriented electrical steel sheets contains:

in mass %,

C: greater than 0.01% and 0.05% or less;

Si: not less than 2.0% nor more than 4.0%;

Mn: not less than 0.05% nor more than 0.5%;

Al: not less than 0.01% nor more than 3.0%; and at least one selected from the group consisting of Ti, V, Zr, and Nb, a balance being composed of Fe and inevitable impurities, when contents of Ti, V, Zr, Nb, and C (mass %) are represented as [Ti], [V], [Zr], [Nb], and [C] respectively, a value of a parameter Q represented by "Q=([Ti]/48+[V]/51+[Zr]/91+[Nb]/93)/([C]/12)" is not less than 0.9 nor more than 1.1, a matrix of a metal structure is a ferrite phase, the metal structure does not include a non-recrystallized structure, an average grain size of ferrite grains constituting the ferrite phase is not less than 10 μm nor more than 200 μm, a precipitate containing at least one selected from the group consisting of Ti, V, Zr, and Nb exists with a density of 10 μm$^{-3}$ or more in the ferrite grain, and an average grain size of the precipitate is not less than 0.002 μm nor more than 0.2 μm.

(8) The laminate for the motor iron core according to (7), wherein each of the non-oriented electrical steel sheets further contains:

in mass %, at least one selected from the group consisting of

N: not less than 0.001% nor more than 0.004%;

Cu: not less than 0.5% nor more than 1.5%; and

Sn: not less than 0.05% nor more than 0.5%.

(9) The laminate for the motor iron core according to (7) or (8), wherein the precipitate is at least one selected from the group consisting of carbide, nitride, and carbonitride.

(10) A method of manufacturing a laminate for a motor iron core including:

laminating non-oriented electrical steel sheets to one another to obtain a laminate; and annealing the laminate under a condition in which a soaking temperature is not lower than 400° C. nor higher than 800° C., a soaking time period is not shorter than 2 minutes nor longer than 10 hours, and an average cooling rate from the soaking temperature to 300° C. is not less than 0.0001° C./sec nor more than 0.1° C./sec, wherein each of the non-oriented electrical steel sheets contains:

in mass %,

C: greater than 0.01% and 0.05% or less;

Si: not less than 2.0% nor more than 4.0%;

Mn: not less than 0.05% nor more than 0.5%;

Al: not less than 0.01% nor more than 3.0%; and at least one selected from the group consisting of Ti, V, Zr, and Nb, a balance being composed of Fe and inevitable impurities, when contents of Ti, V, Zr, Nb, and C (mass %) are represented as [Ti], [V], [Zr], [Nb], and [C] respectively, a value of a parameter Q represented by "Q=([Ti]/48+[V]/51+[Zr]/91+[Nb]/93)/([C]/12)" is not less than 0.9 nor more than 1.1, a matrix of a metal structure is a ferrite phase, the metal structure does not include a non-recrystallized structure, an average grain size of ferrite grains constituting the ferrite phase is not less than 10 μm nor more than 200 μm, a precipitate containing at least one selected from the group consisting of Ti, V, Zr, and Nb exists with a density of 10 μm$^{-3}$ or more in the ferrite grain, and an average grain size of the precipitate is not less than 0.002 μm nor more than 0.2 μm.

(11) The method of manufacturing the laminate for the motor iron core according to (10), wherein each of the non-oriented electrical steel sheets further contains:

in mass %, at least one selected from the group consisting of

N: not less than 0.001% nor more than 0.004%;

Cu: not less than 0.5% nor more than 1.5%; and

Sn: not less than 0.05% nor more than 0.5%.

(12) The method of manufacturing the laminate for the motor iron core according to (10) or (11), wherein the precipitate is at least one selected from the group consisting of carbide, nitride, and carbonitride.

Advantageous Effects of Invention

According to the present invention, a composition and a structure of a non-oriented electrical steel sheet are defined appropriately, so that it is possible to attain achievement of core loss reduction and strength improvement.

DESCRIPTION OF EMBODIMENTS

First, there will be explained a non-oriented electrical steel sheet according to an embodiment of the present invention and a method of manufacturing the same.

The non-oriented electrical steel sheet according to the present embodiment has a predetermined composition, a matrix of a metal structure is a ferrite phase, and the metal structure does not include a non-recrystallized structure. Further, an average grain size of ferrite grains constituting the ferrite phase is not less than 10 μm nor more than 200 μm, a precipitate containing at least one selected from the group consisting of Ti, V, Zr, and Nb exists in the ferrite grain with a density of 10 μm$^{-3}$ or more, and an average grain size of the precipitate is not less than 0.002 μm nor more than 0.2 μm. The constitution makes it possible to attain achievement of core loss reduction and strength improvement. As a result, it is possible to greatly contribute to achievement of high efficiency of a motor, and the like.

Further, in the method of manufacturing the non-oriented electrical steel sheet according to the embodiment, hot rolling of a slab heated to not lower than 1100° C. nor higher than 1330° C. and having a predetermined composition is performed to obtain a hot-rolled steel sheet. Next, cold rolling of the hot-rolled steel sheet is performed to obtain a cold-rolled steel sheet. Next, finish annealing of the cold-rolled steel sheet is performed.

Here, the composition of the non-oriented electrical steel sheet will be explained. Hereinafter, "%" being the unit of a content means "mass %." Further, the composition of the slab is handed over to that of the non-oriented electrical steel sheet as it is, and thus the composition of the non-oriented electrical steel sheet to be explained here is also a composition of a slab to be used for manufacturing the non-oriented electrical steel sheet. The non-oriented electrical steel sheet according to the embodiment contains, for example, C: greater than 0.01% and 0.05% or less, Si: not less than 2.0% nor more than 4.0%, Mn: not less than 0.05% nor more than 0.5%, and Al: not less than 0.01% nor more than 3.0%, and further contains at least one selected from the group consisting of Ti, V, Zr, and Nb. Further, the balance of the non-oriented electrical steel sheet is composed of Fe and inevitable impurities, and when contents of Ti, V, Zr, Nb, and C (mass %) are represented as [Ti], [V], [Zr], [Nb], and [C] respectively, a value of a parameter Q represented by "Q=([Ti]/48+[V]/51+[Zr]/91+[Nb]/93)/([C]/12)" is not less than 0.9 nor more than 1.1.

<C: Greater than 0.01% and 0.05% or Less>

C forms fine precipitates with Ti, V, Zr, and Nb. The fine precipitates contribute to improvement of strength of steel. When the C content is 0.01% or less, it is not possible to obtain the precipitates in an amount sufficient for the improvement of the strength. When the C content is greater than 0.05%, the precipitates are likely to precipitate coarsely. The coarse precipitates do not contribute to the improvement of the strength easily. Further, when the precipitates precipitate coarsely, core loss is likely to deteriorate. Thus, the C content is greater than 0.01% and 0.05% or less. Further, the C content is preferably 0.02% or more, and is also preferably 0.04% or less.

<Si: Not Less than 2.0% Nor More than 4.0%>

Si increases resistivity of steel to reduce core loss. When the Si content is less than 2.0%, it is not possible to obtain the effect sufficiently. When the Si content is greater than 4.0%, steel is brittle to thereby make it difficult to perform rolling. Thus, the Si content is not less than 2.0% nor more than 4.0%. Further, the Si content is preferably 3.5% or less.

<Mn: Not Less than 0.05% Nor More than 0.5%>

Mn, similarly to Si, increases resistivity of steel to reduce core loss. Further, Mn coarsens sulfide to make it harmless. When the Mn content is less than 0.05%, it is not possible to obtain the effects sufficiently. When the Mn content is greater than 0.5%, a magnetic flux density decreases or cracking is likely to occur during cold rolling. Further, an increase in cost is significant. Thus, the Mn content is not less than 0.05% nor more than 0.5%. Further, the Mn content is preferably 0.1% or more, and is also preferably 0.3% or less.

<Al: Not Less than 0.01% Nor More than 3.0%>

Al, similarly to Si, increases resistivity of steel to reduce core loss. Further, Al functions as a deoxidizing material. When the Al content is less than 0.01%, it is not possible to obtain the effects sufficiently. When the Al content is greater than 3.0%, steel is brittle to thereby make it difficult to perform rolling. Thus, the Al content is not less than 0.01% nor more than 3.0%. Further, the Al content is preferably 0.3% or more, and is also preferably 2.0% or less.

<Ti, V, Zr, and Nb>

Ti, V, Zr, and Nb form fine precipitates with C and/or N. The precipitates contribute to improvement of strength of steel. When the value of the parameter Q is less than 0.9, C is excessive with respect to Ti, V, Zr, and Nb, and thus C strongly tends to exist in a solid solution state in a steel sheet after the finish annealing. When C exists in a solid solution state, magnetic aging is likely to occur. When the value of the parameter Q is greater than 1.1, C is insufficient with respect to Ti, V, Zr, and Nb, and thus it is difficult to obtain the fine precipitates to thereby make it impossible to obtain the desired strength. Thus, the value of the parameter Q is not less than 0.9 nor more than 1.1. Further, the value of the parameter Q is preferably 0.95 or more, and is also preferably 1.05 or less.

The non-oriented electrical steel sheet according to the embodiment may further contain at least one selected from the group consisting of N: not less than 0.001% nor more than 0.004%, Cu: not less than 0.5% nor more than 1.5%, and Sn: not less than 0.05% nor more than 0.5%.

<N: Not Less than 0.001% Nor More than 0.004%>

N, similarly to C, forms fine precipitates with Ti, V, Zr, and Nb. The fine precipitates contribute to improvement of strength of steel. When the N content is less than 0.001%, it is not possible to obtain the precipitates in an amount sufficient for the further improvement of the strength. Thus, the N content is preferably 0.001% or more. When the N content is greater than 0.004%, the precipitates are likely to precipitate coarsely. Thus, the N content is 0.004% or less.

<Cu: Not Less than 0.5% Nor More than 1.5%>

The present inventors found out that when Cu is contained in steel, precipitates containing at least one selected from the group consisting of Ti, V, Zr, and Nb are likely to precipitate finely. The fine precipitates contribute to improvement of strength of the steel. When the Cu content is less than 0.5%, it is not possible to obtain the effect sufficiently. Thus, the Cu content is preferably 0.5% or more. Further, the Cu content is more preferably 0.8% or more. When the Cu content is greater than 1.5%, steel is likely to be brittle. Thus, the Cu content is 1.5% or less. Further, the Cu content is also preferably 1.2% or less.

Though the reason why in the case of Cu being contained in steel, the above-described precipitates precipitate finely is unclear, the present inventors suppose that this is because a local concentration distribution of Cu is generated in a matrix to be a precipitation site of carbide. Thus, it is also acceptable that Cu has not precipitated when the precipitate is made to precipitate. On the other hand, a precipitate of Cu contributes to improvement of strength of a non-oriented electrical steel sheet. Thus, it is also acceptable that Cu precipitates.

<Sn: Not Less than 0.05% Nor More than 0.5%>

The present inventors also found out that when Sn is contained in steel, precipitates containing at least one selected from the group consisting of Ti, V, Zr, and Nb are likely to precipitate finely. The fine precipitates contribute to improvement of strength of the steel. When the Sn content is less than 0.05%, it is not possible to obtain the effect sufficiently. Thus, the Sn content is preferably 0.05% or more. Further, the Sn content is more preferably 0.08% or more. When the Sn content is greater than 0.5%, steel is likely to be brittle. Thus, the Sn content is 0.5% or less. Further, the Sn content is also preferably 0.2% or less.

<Other Components>

Ni of not less than 0.5% nor more than 5% and P of not less than 0.005 nor more than 0.1% may also be contained. Ni and P contribute to solid-solution hardening of a steel sheet and the like.

Next, the metal structure of the non-oriented electrical steel sheet will be explained.

As described above, the matrix of the metal structure of the non-oriented electrical steel sheet according to the embodiment is a ferrite phase, and the non-recrystallized structure is not included in the metal structure. This is because the non-recrystallized structure improves strength but deteriorates the core loss significantly. Further, when the average grain size of the ferrite grains constituting the ferrite phase is less than 10 µm, hysteresis loss increases. When the average grain size of the ferrite grains is greater than 200 µm, an effect of fine grain hardening decreases significantly. Thus, the average grain size of the ferrite grains is not less than 10 µm nor more than 200 µm. The average grain size of the ferrite grains is preferably 30 µm or more, and is also preferably 100 µm or less. Further, the average grain size of the ferrite grains is more preferably 60 µm or less.

In the embodiment, precipitates containing at least one selected from the group consisting of Ti, V, Zr, and Nb exists in the ferrite grain. As the precipitates are smaller and a number density of the precipitates is higher, the higher strength can be obtained. Further, the size of the precipitates is important also in terms of magnetic properties. For example, in the case when the diameter of the precipitate is smaller than the thickness of a magnetic domain wall, it is possible to prevent deterioration (increase) of hysteresis loss caused by pinning of domain wall displacement. When the average grain size of the precipitate is greater than 0.2 µm, it is not possible to obtain the effects sufficiently. Thus, the average grain size of the precipitate is 0.2 µm or less. The average grain size is preferably 0.1 µm or less, is more preferably 0.05 µm or less, and is still more preferably 0.01 µm or less.

Incidentally, though, when the theoretical thickness of a magnetic domain wall of a pure iron is estimated in terms of exchange energy and anisotropy energy, it is 0.1 µm or so, the actual thickness of the magnetic domain wall changes according to the orientation in which the magnetic domain wall is formed. Further, as is a non-oriented electrical steel sheet, in the case when elements other than Fe are contained, the thickness of a magnetic domain wall is also affected by their types, amounts and the like. From this viewpoint as well, it is conceivable that the average grain size of the precipitate, which is 0.2 µm or less, is appropriate.

When the average grain size of the precipitate is less than 0.002 µm (2 nm), an effect of increasing the mechanical strength is saturated. Further, it is difficult to control the average grain size of the precipitate in a range of less than 0.002 µm. Thus, the average grain size of the precipitate is 0.002 µm or more.

Further, as the number density of the precipitates is higher, the higher strength can be obtained, and when the number density of the precipitates in the ferrite grain is less than 10 $\mu m^{-3}$, it is difficult to obtain the desired strength. Therefore, the number density of the precipitates is 10 $\mu m^{-3}$ or more. The number density is preferably 1000 $\mu m^{-3}$ or more, is more preferably 10000 $\mu m^{-3}$ or more, is further preferably 100000 $\mu m^{-3}$ or more, and is still more preferably 1000000 $\mu m^{-3}$ or more.

Next, the method of manufacturing the non-oriented electrical steel sheet will be explained. In the embodiment, as described above, the hot rolling of the slab heated to a temperature of not lower than 1100° C. nor higher than 1330° C. is performed to obtain the hot-rolled steel sheet. Next, the cold rolling of the hot-rolled steel sheet is performed to obtain the cold-rolled steel sheet. Next, the finish annealing of the cold-rolled steel sheet is performed.

In the hot rolling, by heating, precipitates containing Ti, V, Zr, and/or Nb, which are contained in the slab, are made to be once solid-dissolved, and in the following temperature-lowering process, precipitates containing Ti, V, Zr, and/or Nb are made to precipitate finely. When a heating temperature is lower than 1100° C., it is difficult to sufficiently solid-dissolve the precipitates containing Ti, V, Zr, and/or Nb. When the heating temperature is higher than 1330° C., there is a risk that the slab is deformed during the heating, or slag occurs. Thus, the heating temperature is not lower than 1100° C. nor higher than 1330° C. The heating temperature is preferably 1150° C. or higher, and is also preferably 1300° C. or lower.

In the hot rolling, for example, rough rolling and finish rolling are performed. A finish temperature of the finish rolling (finishing temperature) is preferably not lower than 750° C. nor higher than 850° C., and a temperature during coiling after the finish rolling (coiling temperature) is preferably 600° C. or lower. In either case, this is to make the precipitates containing Ti, V, Zr, and/or Nb precipitate as finely as possible.

The thickness of the hot-rolled steel sheet is not limited in particular. However, it is not easy to make the thickness of the hot-rolled steel sheet to less than 1.6 mm, which also leads to a decrease in productivity. On the other hand, when the thickness of the hot-rolled steel sheet is 2.7 mm, it is sometimes necessary to excessively increase a reduction ratio in the following cold rolling. In the case when the reduction ratio in the cold rolling is high excessively, a texture of a non-oriented electrical steel sheet may sometimes deteriorate and magnetic properties (magnetic flux density and core loss) deteriorate. Thus, the thickness of the hot-rolled steel sheet is preferably not less than 1.6 mm nor more than 2.7 mm.

The cold rolling may be performed only one time, or may also be performed two or more times with intermediate annealing being interposed therebetween. The final reduction ratio in the cold rolling is preferably not less than 60% nor more than 90%. This is to make the metal structure (texture) of a non-oriented electrical steel sheet obtained after the finish annealing better to obtain a high magnetic flux density and a low core loss. Further, in the case of the intermediate annealing being performed, its temperature is preferably not lower than 900° C. nor higher than 1100° C. This is to make the metal structure better. The final reduction ratio is more preferably 65% or more, and is also more preferably 82% or less.

A soaking temperature of the finish annealing is preferably 850° C. or higher, and a soaking time period is preferably 20 seconds or longer. This is to make the average grain size of ferrite grains in a non-oriented electrical steel sheet 10 µm or more and make a metal structure better.

Incidentally, when the soaking temperature of the finish annealing is greater than 1100° C., the precipitates containing Ti, V, Zr, and/or Nb that have precipitated finely in the cold-rolled steel sheet are solid-dissolved to strongly tend to precipitate thereafter not in crystal grains but in grain boundaries. Thus, the soaking temperature of the finish annealing is preferably 1100° C. or lower. Incidentally, when the soaking temperature is longer than 2 minutes, a decrease in productivity is significant. Thus, the soaking temperature is preferably 2 minutes or shorter.

Incidentally, before performing the cold rolling, annealing of the hot-rolled steel sheet, namely hot-rolled sheet annealing may also be performed. The appropriate hot-rolled sheet annealing is performed, thereby making a texture of a non-oriented electrical steel sheet more desirable and making it possible to obtain a more excellent magnetic flux density. In the case when a soaking temperature of the hot-rolled sheet annealing is lower than 850° C., and in the case when a soaking time period is shorter than 30 seconds, it is difficult to make the texture more desirable. In the case when the soaking temperature is higher than 1100° C., the precipitates containing Ti, V, Zr, and/or Nb that have precipitated finely in the hot-rolled steel sheet are solid-dissolved to strongly tend to precipitate thereafter not in crystal grains but in grain boundaries. When the soaking time period is longer than 5 minutes, a decrease in productivity is significant. Thus, in the hot-rolled sheet annealing, the soaking temperature is preferably not lower than 850° C. nor higher than 1100° C. and the soaking time period is preferably not shorter than 30 seconds nor longer than 5 minutes.

In this manner, the non-oriented electrical steel sheet according to the embodiment may be manufactured. Then, the non-oriented electrical steel sheet manufactured in this manner is provided with the metal structure as described above to be able to obtain the high strength and the low core loss. That is, the above-described precipitates are generated during the hot rolling, and recrystallization is caused and the above-described ferrite phase is generated during the finish annealing. Incidentally, an insulating coating film may also be formed according to need after the finish annealing.

Next, there will be explained a laminate for a motor iron core constituted with the non-oriented electrical steel sheets according to the embodiment.

The non-oriented electrical steel sheets according to the embodiment are included in the laminate for the motor iron core. The laminate for the motor iron core may be obtained in a manner that the non-oriented electrical steel sheets are formed into a desired shape by punching or the like, and are laminated to be fixed by caulking or the like, for example. Since the non-oriented electrical steel sheets according to the embodiment are included, a core loss of the laminate for the motor iron core is low and mechanical strength of the laminate is high.

The laminate for the motor iron core may be completed at the time when the fixation as described above is finished. Further, annealing may be performed after the above-described fixation and before completing the laminate. The annealing may be performed under a condition in which a soaking temperature is not lower than 400° C. nor higher than 800° C., a soaking time period is not shorter than 2 minutes nor longer than 10 hours, and an average cooling rate from the soaking temperature to 300° C. is not less than 0.0001° C. nor more than 0.1° C., and the laminate for a motor iron core may be completed after finishing the annealing. Precipitates are precipitated through the annealing, thereby making it possible to further improve the strength.

In the case when the soaking temperature of the annealing is lower than 400° C., and in the case when the soaking time period is shorter than 2 minutes, it is difficult to make the precipitates precipitate sufficiently. In the case when the soaking temperature is higher than 800° C., and in the case when the soaking time period is longer than 10 hours, energy consumption is increased, or associated facilities are likely to be damaged, and an increase in cost is significant. Further, the precipitates may sometimes precipitate coarsely to thereby make it difficult to increase the strength sufficiently. Thus, the soaking temperature is preferably not lower than 400° C. nor higher than 800° C., and the soaking time period is preferably not shorter than 2 minutes nor longer than 10 hours. Further, the soaking time period is more preferably 500° C. or higher, and the soaking time period is more preferably 10 minutes or longer. When the average cooling rate from the soaking temperature to 300° C. is less than 0.0001° C./sec, carbide is likely to precipitate coarsely. When the average cooling rate is greater than 0.1° C./sec, it is difficult to make the precipitates precipitate sufficiently. Thus, the average cooling rate from the soaking temperature to 300° C. is preferably not less than 0.0001° C./sec nor more than 0.1° C./sec.

EXAMPLE

Next, there will be explained experiments conducted by the present inventors. Conditions and so on in these experiments are examples employed for confirming the applicability and effects of the present invention, and the present invention is not limited to these examples.

Experimental Example 1

First, steels having various compositions listed in Table 1 were melted by vacuum melting. Then, obtained slabs were each heated at 1250° C. for 1 hour. Thereafter, hot rolling of each of the slabs heated to a temperature of 1250° C. was performed to obtain hot-rolled steel sheets. The thickness of each of the hot-rolled steel sheets (hot-rolled sheets) was 2.0 mm. Subsequently, pickling of each of the hot-rolled steel sheets was performed, and cold rolling of each of the hot-rolled steel sheets was performed to obtain cold rolling. The thickness of each of the cold-rolled steel sheets (cold-rolled sheets) was 0.35 mm. Then, finish annealing of each of the cold-rolled steel sheets was performed. A soaking temperature was 1000° C. and a soaking time period was 30 seconds in the finish annealing. In this manner, various non-oriented electrical steel sheets were manufactured. Then, a metal structure of each of the non-oriented electrical steel sheets was observed. In the observation of the metal structure, for example, measurement of a grain size (JIS G 0552) and observation of precipitates were performed. Further, a JIS No. 5 test piece was cut out from each of the non-oriented electrical steel sheets, and its mechanical property was measured. Further, a test piece of 55 mm×55 mm was cut out from each of the non-oriented electrical steel sheets, and its magnetic property were measured by a single sheet magnetic property measurement method (JIS C 2556). As the magnetic property, a core loss under a condition of a frequency being 400 Hz and a maximum magnetic flux density being 1.0 T (W10/400) was measured. Further, a core loss (W10/400) was measured also after an aging treatment at 200° C. for 1 day in order to observe an effect of magnetic aging. That is, with respect to each of the non-oriented electrical steel sheets, the core loss (W10/400) was measured before and after the aging treatment. These results are listed in Table 2.

TABLE 1

| STEEL No. | COMPONENT (MASS %) | | | | | | | | | | | PARAMETER Q |
|---|---|---|---|---|---|---|---|---|---|---|---|---|
| | C | Si | Mn | Al | Ti | V | Zr | Nb | N | Cu | Sn | |
| A1 | 0.0110 | 2.9 | 0.2 | 0.7 | 0.0020 | 0.0020 | 0.0020 | 0.0800 | — | — | — | 1.05 |
| A2 | 0.0480 | 2.9 | 0.2 | 0.7 | 0.1800 | 0.0020 | 0.0020 | 0.0500 | — | — | — | 1.09 |
| A3 | 0.0350 | 2.1 | 0.2 | 0.7 | 0.0500 | 0.0020 | 0.0020 | 0.1800 | — | — | — | 1.04 |
| A4 | 0.0360 | 3.8 | 0.2 | 0.7 | 0.0500 | 0.0020 | 0.0020 | 0.1800 | — | — | — | 1.01 |
| A5 | 0.0370 | 2.9 | 0.07 | 0.7 | 0.0500 | 0.0020 | 0.0020 | 0.1800 | — | — | — | 0.99 |
| A6 | 0.0360 | 2.9 | 0.5 | 0.7 | 0.0500 | 0.0020 | 0.0020 | 0.1800 | — | — | — | 1.01 |
| A7 | 0.0360 | 2.9 | 0.2 | 0.05 | 0.0500 | 0.0020 | 0.0020 | 0.1800 | — | — | — | 1.01 |
| A8 | 0.0300 | 2.9 | 0.3 | 2.5 | 0.0410 | 0.0020 | 0.0020 | 0.1600 | — | — | — | 1.05 |
| A9 | 0.0300 | 2.9 | 0.3 | 0.7 | 0.0300 | 0.0020 | 0.0020 | 0.1500 | — | — | — | 0.92 |
| A10 | 0.0300 | 2.9 | 0.2 | 0.8 | 0.0450 | 0.0020 | 0.0020 | 0.1600 | — | — | — | 1.09 |
| A11 | 0.0300 | 2.9 | 0.3 | 0.6 | 0.0020 | 0.0020 | 0.0020 | 0.2300 | — | — | — | 1.03 |
| A12 | 0.0290 | 2.9 | 0.3 | 0.6 | 0.0020 | 0.0020 | 0.2200 | 0.0020 | — | — | — | 1.04 |
| A13 | 0.0290 | 2.9 | 0.3 | 0.7 | 0.0020 | 0.1200 | 0.0020 | 0.0020 | — | — | — | 1.01 |
| A14 | 0.0300 | 2.9 | 0.3 | 0.7 | 0.1100 | 0.0020 | 0.0020 | 0.0020 | — | — | — | 0.95 |
| A15 | 0.0290 | 2.9 | 0.3 | 0.7 | 0.0400 | 0.0020 | 0.0020 | 0.1600 | 0.0030 | — | — | 1.08 |
| A16 | 0.0300 | 2.9 | 0.3 | 0.7 | 0.0410 | 0.0020 | 0.0020 | 0.1600 | — | 0.5000 | — | 1.05 |
| A17 | 0.0310 | 2.9 | 0.3 | 0.7 | 0.0420 | 0.0020 | 0.0020 | 0.1600 | — | 1.1000 | — | 1.03 |
| A18 | 0.0310 | 2.9 | 0.2 | 0.7 | 0.0390 | 0.0020 | 0.0020 | 0.1600 | — | 1.4000 | — | 1.00 |
| A19 | 0.0300 | 2.9 | 0.2 | 0.7 | 0.0400 | 0.0020 | 0.0020 | 0.1600 | — | — | 0.0900 | 1.05 |
| B1 | 0.0020 | 2.9 | 0.3 | 0.7 | 0.0400 | 0.0020 | 0.0020 | 0.1600 | — | — | — | 15.69 |
| B2 | 0.1000 | 2.9 | 0.3 | 0.7 | 0.0400 | 0.0020 | 0.0020 | 0.1600 | — | — | — | 0.31 |
| B3 | 0.0300 | 1.5 | 0.3 | 0.7 | 0.0400 | 0.0020 | 0.0020 | 0.1600 | — | — | — | 1.05 |
| B4 | 0.0330 | 4.4 | 0.3 | 0.7 | 0.0400 | 0.0020 | 0.0020 | 0.1600 | — | — | — | 0.95 |
| B5 | 0.0290 | 2.9 | 0.03 | 0.7 | 0.0400 | 0.0020 | 0.0020 | 0.1600 | — | — | — | 1.08 |
| B6 | 0.0310 | 2.9 | 0.9 | 0.7 | 0.0400 | 0.0020 | 0.0020 | 0.1600 | — | — | — | 1.01 |
| B7 | 0.0290 | 2.9 | 0.3 | 0.005 | 0.0400 | 0.0020 | 0.0020 | 0.1600 | — | — | — | 1.08 |
| B8 | 0.0300 | 2.9 | 0.3 | 3.5 | 0.0400 | 0.0020 | 0.0020 | 0.1600 | — | — | — | 1.05 |

TABLE 2

| | | METAL STRUCTURE | | | | | | MAGNETIC PROPERTIES | | |
| | | NON-CRYSTALLIZED STRUCTURE AREA RATIO (%) | FERRITE PHASE AVERAGE GRAIN DIAMETER (µm) | PRECIPITATE | | | MECHANICAL PROPERTY TENSILE STRENGTH (MPa) | BEFORE AGING TREATMENT W 10/400 (W/kg) | AFTER AGING TREATMENT W 10/400 (W/kg) | |
| CONDITION No. | STEEL No. | | | AVERAGE GRAIN DIAMETER (µm) | NUMBER DENSITY (µm$^{-3}$) | TYPES OF MAIN PRECIPITATES | | | | REMARKS |
|---|---|---|---|---|---|---|---|---|---|---|
| INVENTIVE EXAMPLE | | | | | | | | | | |
| C1 | A1 | 0 | 72 | 0.02 | 7,500 | NbC | 560 | 22 | 21 | |
| C2 | A2 | 0 | 23 | 0.07 | 144,000 | TiC, NbC | 660 | 32 | 33 | |
| C3 | A3 | 0 | 45 | 0.04 | 48,000 | TiC, NbC | 590 | 31 | 31 | |
| C4 | A4 | 0 | 32 | 0.05 | 47,000 | TiC, NbC | 640 | 22 | 28 | |
| C5 | A5 | 0 | 35 | 0.05 | 33,000 | TiC, NbC | 630 | 28 | 29 | |
| C6 | A6 | 0 | 32 | 0.04 | 42,000 | TiC, NbC | 630 | 29 | 28 | |
| C7 | A7 | 0 | 36 | 0.04 | 38,000 | TiC, NbC | 620 | 28 | 28 | |
| C8 | A8 | 0 | 37 | 0.05 | 41,000 | TiC, NbC | 620 | 30 | 29 | |
| C9 | A9 | 0 | 32 | 0.08 | 34,000 | TiC, NbC | 620 | 29 | 30 | |
| C10 | A10 | 0 | 34 | 0.05 | 42,000 | TiC, NbC | 610 | 28 | 29 | |
| C11 | A11 | 0 | 38 | 0.04 | 47,000 | NbC | 600 | 27 | 29 | |
| C12 | A12 | 0 | 35 | 0.06 | 39,000 | ZrC | 610 | 28 | 28 | |
| C13 | A13 | 0 | 34 | 0.06 | 48,000 | VC | 600 | 29 | 29 | |
| C14 | A14 | 0 | 32 | 0.06 | 51,000 | TiC | 610 | 27 | 27 | |
| C15 | A15 | 0 | 38 | 0.05 | 52,000 | TiN, TiC, Ti(C,N) NbN, NbC, Nb(C,N) | 630 | 30 | 30 | |
| C16 | A16 | 0 | 33 | 0.008 | 810,000 | TiC, NbC | 700 | 25 | 26 | |
| C17 | A17 | 0 | 33 | 0.007 | 920,000 | TiC, NbC, Cu | 710 | 27 | 26 | |
| C18 | A18 | 0 | 35 | 0.008 | 1,040,000 | TiC, NbC, Cu | 720 | 29 | 26 | |
| C19 | A19 | 0 | 37 | 0.03 | 49,000 | TiC, NbC | 610 | 28 | 29 | |

TABLE 2-continued

| | | | METAL STRUCTURE | | | | | MAGNETIC PROPERTIES | | |
|---|---|---|---|---|---|---|---|---|---|---|
| | | | | | | | | | BEFORE AGING TREATMENT | AFTER AGING TREATMENT |
| | | | NON-CRYSTAL-LIZED STRUCTURE AREA RATIO (%) | FERRITE PHASE AVERAGE GRAIN DIAMETER (μm) | PRECIPITATE | | | | | |
| | CONDITION No. | STEEL No. | | | AVERAGE GRAIN DIAMETER (μm) | NUMBER DENSITY (μm$^{-3}$) | TYPES OF MAIN PRECIPITATES | MECHANICAL PROPERTY TENSILE STRENGTH (MPa) | W 10/400 (W/kg) | W 10/400 (W/kg) | REMARKS |
| COMPARATIVE EXAMPLE | D1 | B1 | 85 | 5 | NOT OBSERVED | NOT OBSERVED | NOT OBSERVED | 500 | 21 | 20 | MECHANICAL STRENGTH WAS POOR. |
| | D2 | B2 | 0 | 32 | 1.5 | 320 | Fe$_3$C, TiC, NbC | 630 | 42 | 51 | CORE LOSS WAS HIGH. CORE LOSS DETERIORATED THROUGH AGING TREATMENT. |
| | D3 | B3 | 0 | 44 | 0.05 | 41,000 | TiC, NbC | 570 | 37 | 36 | CORE LOSS WAS HIGH. |
| | D4 | B4 | — | — | — | — | — | — | — | — | WORKABILITY WAS POOR, AND STEEL SHEET BROKE DURING COLD ROLLING. |
| | D5 | B5 | 0 | 32 | 0.06 | 39,000 | TiC, NbC | 590 | 41 | 42 | CORE LOSS WAS HIGH. |
| | D6 | B6 | — | — | — | — | — | — | — | — | WORKABILITY WAS POOR, AND STEEL SHEET BROKE DURING COLD ROLLING. |
| | D7 | B7 | 0 | 27 | 0.07 | 42,000 | TiC, NbC | 600 | 42 | 42 | CORE LOSS WAS HIGH. |
| | D8 | B8 | — | — | — | — | — | — | — | — | WORKABILITY WAS POOR, AND STEEL SHEET BROKE DURING COLD ROLLING. |

As listed in Table 2, in conditions No. C1 to No. C19 each falling within the range of the present invention, it was possible to obtain a tensile strength of 550 MPa or more and a core loss (W10/400) of 35 W/kg or less. On the other hand, in conditions No. D1 to No. D8 each falling outside the range of the present invention, it was difficult to achieve the tensile strength and the core loss.

Experimental Example 2

First, slabs made of steels No. A11 and No. A17 listed in Table 1 were heated at temperatures listed in Table 3 for 1 hour. Then, hot rolling of each of the slabs heated to the temperatures listed in Table 3 was performed to obtain hot-rolled steel sheets. The thickness of each of the hot-rolled steel sheets was 2.0 mm. Thereafter, annealing (hot-rolled sheet annealing) of one (condition No. E4) of the hot-rolled steel sheets was performed under the condition listed in Table 3. Subsequently, pickling of each of the hot-rolled steel sheets was performed, and cold rolling of each of the hot-rolled steel sheets was performed to obtain cold rolling. The thickness of each of the cold-rolled steel sheets was 0.35 mm. Then, finish annealing of each of the cold-rolled steel sheets was performed. A soaking temperature was 1000° C. and a soaking time period was 30 seconds in the finish annealing. In this manner, various non-oriented electrical steel sheets were manufactured. Thereafter, with respect to each of the non-oriented electrical steel sheets, the evaluations similar to those of Experimental example 1 were performed. These results are also listed in Table 3.

TABLE 3

| | CONDITION No. | STEEL No. | SLAB HEATING HEATING TEMPERATURE (°C.) | HOT-ROLLED SHEET ANNEALING SOAKING TEMPERATURE (°C.) | HOT-ROLLED SHEET ANNEALING SOAKING TIME PERIOD (sec) | METAL STRUCTURE NON-CRYSTALLIZED STRUCTURE AREA RATIO (%) | FERRITE PHASE AVERAGE GRAIN DIAMETER (μm) | PRECIPITATE AVERAGE GRAIN DIAMETER (μm) | PRECIPITATE NUMBER DENSITY (μm$^{-3}$) | PRECIPITATE TYPES OF MAIN PRECIPITATES |
|---|---|---|---|---|---|---|---|---|---|---|
| INVENTIVE EXAMPLE | E1 | A11 | 1150 | — | — | 0 | 165 | 0.15 | 250 | NbC |
| | E2 | A11 | 1290 | — | — | 0 | 15 | 0.01 | 84000 | NbC |
| | E3 | A11 | 1250 | — | — | 0 | 32 | 0.04 | 47000 | NbC |
| | E4 | A11 | 1250 | 950 | 60 | 0 | 33 | 0.05 | 38000 | NbC |
| | E5 | A17 | 1150 | — | — | 0 | 95 | 0.007 | 920000 | TiC, NbC, Cu |
| | E6 | A17 | 1250 | — | — | 0 | 32 | 0.015 | 83000 | TiC, NbC, Cu |
| COMPARATIVE EXAMPLE | F1 | A11 | 1050 | — | — | 0 | 210 | 1.1 | 330 | NbC |
| | F2 | A11 | 1340 | — | — | 0 | 9 | 0.01 | 91000 | NbC |

| | CONDITION No. | STEEL No. | MECHANICAL PROPERTY TENSILE STRENGTH (MPa) | MAGNETIC PROPERTIES BEFORE AGING TREATMENT W10/400 (W/kg) | AFTER AGING TREATMENT W10/400 (W/kg) | REMARKS |
|---|---|---|---|---|---|---|
| INVENTIVE EXAMPLE | E1 | A11 | 580 | 21 | 21 | |
| | E2 | A11 | 660 | 34 | 33 | |
| | E3 | A11 | 600 | 27 | 28 | |
| | E4 | A11 | 590 | 25 | 25 | |
| | E5 | A17 | 710 | 27 | 26 | |
| | E6 | A17 | 680 | 32 | 33 | |
| COMPARATIVE EXAMPLE | F1 | A11 | 490 | 21 | 21 | PRECIPITATES WERE LARGE, AND MECHANICAL STRENGTH WAS POOR |
| | F2 | A11 | 640 | 38 | 38 | FERRITE GRAINS WERE SMALL AND CORE LOSS WAS HIGH. |

As listed in Table 3, in conditions No. E1 to No. E6 each falling within the range of the present invention, it was possible to obtain a tensile strength of 550 MPa or more and a core loss (W10/400) of 35 W/kg or less. On the other hand, in conditions No. F1 and No. F2 each falling outside the range of the present invention, it was difficult to achieve the tensile strength and the core loss.

Experimental Example 3

First, slabs made of steels No. A11 and No. A17 listed in Table 1 were each heated for 1 hour. At that time, a slab heating temperature of the steel No. A11 was 1250° C., and the slab heating temperature of the steel No. A11 was 1150° C. Then, hot rolling of each of the slabs heated to 1250° C. or 1150° C. was performed to obtain hot-rolled steel sheets. The thickness of each of the hot-rolled steel sheets was 2.0 mm. Thereafter, pickling of each of the hot-rolled steel sheets was performed, and cold rolling of each of the hot-rolled steel sheets was performed to obtain cold rolling. The thickness of each of the cold-rolled steel sheets was 0.35 mm. Subsequently, finish annealing of each of the cold-rolled steel sheets was performed. A soaking temperature was 1000° C. and a soaking time period was 30 seconds in the finish annealing. Then, an insulating film was formed on the surface of each of the cold-rolled steel sheets obtained after the finish annealing. In this manner, various non-oriented electrical steel sheets were manufactured.

Thereafter, 30 steel sheets each having a size in a rolling direction of 300 mm and a size in a direction perpendicular to the rolling direction of 60 mm were punched out from each of the non-oriented electrical steel sheets. The steel sheet having such a shape and size is sometimes used for an actual motor core. Then, the 30 steel sheets were laminated to one another to obtain a laminate. Subsequently, annealing of each of the laminates was performed under the condition listed in Table 4. Then, a steel sheet for a test was extracted from each of the laminates, and with respect to the steel sheet, the evaluations similar to those of Experimental example 1 were performed. That is, the evaluation intended for a laminate used for a motor core was performed. These results are also listed in Table 4. Here, ones with the annealing condition deviating from the above-described favorable condition were each set as a comparative example.

TABLE 4

| | | | ANNEALING OF LAMINATE | | | METAL STRUCTURE | | | | |
|---|---|---|---|---|---|---|---|---|---|---|
| | | | | | | NON-CRYS-TAL-LIZED STRUC-TURE AREA RATIO (%) | FER-RITE PHASE AVER-AGE GRAIN DIAM-ETER (μm) | PRECIPITATE | | |
| | CONDI-TION No. | STEEL No. | SOAK-ING TEM-PER-ATURE (°C.) | SOAK-ING TIME PERI-OD (min) | AVER-AGE COOL-ING RATE (°C./sec) | | | AVER-AGE GRAIN DIAM-ETER (μm) | NUM-BER DEN-SITY (μm$^{-3}$) | TYPES OF MAIN PRE-CIP-ITATES |
| INVENTIVE EXAMPLE | G1 | A11 | 400 | 60 | 0.03 | 0 | 32 | 0.04 | 47,000 | NbC |
| | G2 | A11 | 800 | 60 | 0.03 | 0 | 62 | 0.05 | 52,000 | NbC |
| | G3 | A11 | 750 | 2 | 0.03 | 0 | 42 | 0.04 | 45,000 | NbC |
| | G4 | A11 | 750 | 120 | 0.03 | 0 | 45 | 0.05 | 47,000 | NbC |
| | G5 | A17 | 550 | 10 | 0.001 | 0 | 95 | 0.004 | 1,050,000 | TiC, NbC, Cu |
| | G6 | A17 | 550 | 10 | 0.1 | 0 | 100 | 0.005 | 950,000 | TiC, NbC, Cu |
| COMPAR-ATIVE EXAMPLE | G7 | A17 | 550 | 10 | 0.03 | 0 | 105 | 0.005 | 1,050,000 | TiC, NbC, Cu |
| | H1 | A11 | 380 | 60 | 0.03 | 0 | 33 | 0.05 | 38,000 | NbC |
| | H2 | A11 | 850 | 60 | 0.03 | 0 | 34 | 0.08 | 29,000 | NbC |
| | H3 | A11 | 750 | 1 | 0.03 | 0 | 35 | 0.05 | 37,000 | NbC |
| | H4 | A11 | 750 | 40000 | 0.03 | 0 | 32 | 0.04 | 40,000 | NbC |
| | H5 | A11 | 750 | 60 | 0.00001 | 0 | 35 | 0.05 | 35,000 | NbC |
| | H6 | A11 | 750 | 60 | 1 | 0 | 34 | 0.04 | 42,000 | NbC |

| | CONDI-TION No. | STEEL No. | MECHANICAL PROPERTY TENSILE STRENGTH (MPa) | MAGNETIC PROPERTIES BEFORE AGING TREAT-MENT W 10/400 (W/kg) | AFTER AGING TREAT-MENT W 10/400 (W/kg) | REMARKS |
|---|---|---|---|---|---|---|
| INVENTIVE EXAMPLE | G1 | A11 | 600 | 27 | 28 | |
| | G2 | A11 | 620 | 23 | 22 | |
| | G3 | A11 | 630 | 26 | 26 | |
| | G4 | A11 | 630 | 24 | 24 | |
| | G5 | A17 | 750 | 24 | 25 | |
| | G6 | A17 | 745 | 23 | 24 | |
| COMPAR-ATIVE EXAMPLE | G7 | A17 | 755 | 24 | 25 | |
| | H1 | A11 | 590 | 25 | 25 | MECHANICAL STRENGTH DID NOT INCREASE SUFFICIENTLY |
| | H2 | A11 | 570 | 25 | 24 | MECHANICAL STRENGTH DID NOT INCREASE SUFFICIENTLY |
| | H3 | A11 | 580 | 24 | 24 | MECHANICAL STRENGTH DID NOT INCREASE SUFFICIENTLY |
| | H4 | A11 | 600 | 25 | 24 | PRODUCTIVITY OF ANNEALING OF LAMINATE WAS POOR. |
| | H5 | A11 | 620 | 24 | 24 | PRODUCTIVITY OF ANNEAL-ING OF LAMINATE WAS POOR |

TABLE 4-continued

| | H6 | A11 | 620 | 33 | 33 | CORE LOSS WAS HIGH. |

As listed in Table 4, in conditions No. G1 to No. G7 in which the favorable annealing was performed, it was possible to sufficiently improve the tensile strength. On the other hand, in conditions No. H1 to No. H6 with the annealing condition deviating from the favorable range, it was not possible to sufficiently improve the tensile strength, the productivity was low, or the core loss was high.

It should be noted that the above-described embodiment merely illustrates a concrete example of implementing the present invention, and the technical scope of the present invention is not to be construed in a restrictive manner by the embodiment. That is, the present invention may be implemented in various forms without departing from the technical spirit or main features thereof.

INDUSTRIAL APPLICABILITY

The present invention may be utilized in an industry of manufacturing electrical steel sheets and in an industry of utilizing electrical steel sheets such as motors, for example.

The invention claimed is:

1. A non-oriented electrical steel sheet containing:
in mass %,
C: greater than 0.01% and 0.05% or less;
Si: not less than 2.0% nor more than 4.0%;
Mn: not less than 0.05% nor more than 0.5%;
Al: not less than 0.01% nor more than 3.0%; and
at least one selected from the group consisting of Ti, V, Zr, and Nb,
a balance being composed of Fe and inevitable impurities, wherein
when contents of Ti, V, Zr, Nb, and C (mass %) are represented as [Ti], [V], [Zr], [Nb], and [C] respectively, a value of a parameter Q represented by "Q=([Ti]/48+[V]/51+[Zr]/91+[Nb]/93)/([C]/12)" is not less than 0.9 nor more than 1.1,
a matrix of a metal structure is a ferrite phase,
the metal structure does not comprise a non-recrystallized structure,
an average grain size of ferrite grains constituting the ferrite phase is not less than 10 μm nor more than 200 μm,
a precipitate containing at least one selected from the group consisting of Ti, V, Zr, and Nb exists with a density of 10 μm$^{-3}$ or more in the ferrite grain, and
an average grain size of the precipitate is not less than 0.002 μm nor more than 0.2 μm.

2. The non-oriented electrical steel sheet according to claim 1, further containing:
in mass %, at least one selected from the group consisting of
N: not less than 0.001% nor more than 0.004%;
Cu: not less than 0.5% nor more than 1.5%; and
Sn: not less than 0.05% nor more than 0.5%.

3. The non-oriented electrical steel sheet according to claim 1, wherein the precipitate is at least one selected from the group consisting of carbide, nitride, and carbonitride.

4. The non-oriented electrical steel sheet according to claim 2, wherein the precipitate is at least one selected from the group consisting of carbide, nitride, and carbonitride.

5. A method of manufacturing a non-oriented electrical steel sheet comprising:
performing hot rolling of a slab heated to a temperature of not lower than 1100° C. nor higher than 1330° C. to obtain a hot-rolled steel sheet;
performing cold rolling of the hot-rolled steel sheet to obtain a cold-rolled steel sheet; and
performing finish annealing of the cold-rolled steel sheet at a temperature of not lower than 850° C. nor higher than 1100° C.,
wherein
the slab contains:
in mass %,
C: greater than 0.01% and 0.05% or less;
Si: not less than 2.0% nor more than 4.0%;
Mn: not less than 0.05% nor more than 0.5%;
Al: not less than 0.01% nor more than 3.0%; and
at least one selected from the group consisting of Ti, V, Zr, and Nb,
a balance being composed of Fe and inevitable impurities, and
when contents of Ti, V, Zr, Nb, and C (mass %) are represented as [Ti], [V], [Zr], [Nb], and [C] respectively, a value of a parameter Q represented by "Q=([Ti]/48+[V]/51+[Zr]/91+[Nb]/93)/([C]/12)" is not less than 0.9 nor more than 1.1.

6. The method of manufacturing the non-oriented electrical steel sheet according to claim 5, wherein the slab further contains:
in mass %, at least one selected from the group consisting of
N: not less than 0.001% nor more than 0.004%;
Cu: not less than 0.5% nor more than 1.5%; and
Sn: not less than 0.05% nor more than 0.5%.

7. The method of manufacturing the non-oriented electrical steel sheet according to claim 5, further comprising, before the performing cold rolling, performing hot-rolled sheet annealing of the hot-rolled steel sheet.

8. The method of manufacturing the non-oriented electrical steel sheet according to claim 6, further comprising, before the performing cold rolling, performing hot-rolled sheet annealing of the hot-rolled steel sheet.

9. A laminate for a motor iron core comprising:
non-oriented electrical steel sheets laminated to one another,
wherein
each of the non-oriented electrical steel sheets contains:
in mass %,
C: greater than 0.01% and 0.05% or less;
Si: not less than 2.0% nor more than 4.0%;
Mn: not less than 0.05% nor more than 0.5%;
Al: not less than 0.01% nor more than 3.0%; and
at least one selected from the group consisting of Ti, V, Zr, and Nb,
a balance being composed of Fe and inevitable impurities,
when contents of Ti, V, Zr, Nb, and C (mass %) are represented as [Ti], [V], [Zr], [Nb], and [C] respectively, a value of a parameter Q represented by "Q=([Ti]/48+[V]/51+[Zr]/91+[Nb]/93)/([C]/12)" is not less than 0.9 nor more than 1.1,
a matrix of a metal structure is a ferrite phase, the metal structure does not comprise a non-recrystallized structure, an average grain size of ferrite grains constituting the ferrite phase is not less than 10 μm nor more than 200 μm, a precipitate containing at least one selected from the group consisting of Ti, V, Zr, and Nb exists with a density of 10 μm$^{-3}$ or more in the ferrite grain, and an average grain size of the precipitate is not less than 0.002 μm nor more than 0.2 μm.

10. The laminate for the motor iron core according to claim 9, wherein each of the non-oriented electrical steel sheets further contains:

in mass %, at least one selected from the group consisting of

N: not less than 0.001% nor more than 0.004%;
Cu: not less than 0.5% nor more than 1.5%; and
Sn: not less than 0.05% nor more than 0.5%.

11. The laminate for the motor iron core according to claim 9, wherein the precipitate is at least one selected from the group consisting of carbide, nitride, and carbonitride.

12. The laminate for the motor iron core according to claim 10, wherein the precipitate is at least one selected from the group consisting of carbide, nitride, and carbonitride.

13. A method of manufacturing a laminate for a motor iron core comprising:

laminating non-oriented electrical steel sheets to one another to obtain a laminate; and annealing the laminate under a condition in which a soaking temperature is not lower than 400° C. nor higher than 800° C., a soaking time period is not shorter than 2 minutes nor longer than 10 hours, and an average cooling rate from the soaking temperature to 300° C. is not less than 0.0001° C./sec nor more than 0.1° C./sec, wherein each of the non-oriented electrical steel sheets contains:
in mass %,
C: greater than 0.01% and 0.05% or less;
Si: not less than 2.0% nor more than 4.0%;
Mn: not less than 0.05% nor more than 0.5%;
Al: not less than 0.01% nor more than 3.0%; and
at least one selected from the group consisting of Ti, V, Zr, and Nb, a balance being composed of Fe and inevitable impurities, when contents of Ti, V, Zr, Nb, and C (mass %) are represented as [Ti], [V], [Zr], [Nb], and [C] respectively, a value of a parameter Q represented by "Q=([Ti]/48+[V]/51+[Zr]/91+[Nb]/93)/([C]/12)" is not less than 0.9 nor more than 1.1, a matrix of a metal structure is a ferrite phase, the metal structure does not comprise a non-recrystallized structure, an average grain size of ferrite grains constituting the ferrite phase is not less than 10 μm nor more than 200 μm, a precipitate containing at least one selected from the group consisting of Ti, V, Zr, and Nb exists with a density of 10 μm$^{-3}$ or more in the ferrite grain, and an average grain size of the precipitate is not less than 0.002 μm nor more than 0.2 μm.

14. The method of manufacturing the laminate for the motor iron core according to claim 13, wherein each of the non-oriented electrical steel sheets further contains:

in mass %, at least one selected from the group consisting of

N: not less than 0.001% nor more than 0.004%;
Cu: not less than 0.5% nor more than 1.5%; and
Sn: not less than 0.05% nor more than 0.5%.

15. The method of manufacturing the laminate for the motor iron core according to claim 13, wherein the precipitate is at least one selected from the group consisting of carbide, nitride, and carbonitride.

16. The method of manufacturing the laminate for the motor iron core according to claim 14, wherein the precipitate is at least one selected from the group consisting of carbide, nitride, and carbonitride.

* * * * *